Patented May 21, 1946

2,400,494

UNITED STATES PATENT OFFICE 2,400,494

MANUFACTURE OF HIGHER FATTY ACID ESTERS OF CELLULOSE

James Wotherspoon Fisher, Spondon, near Derby, England, assignor to British Celanese Limited, London W. 1, England, a company of Great Britain No Drawing. Application October 27, 1943, Serial No. 507,889. In Great Britain December 14, 1942

11 Claims. (Cl. 260—225)

This invention relates to the manufacture of higher fatty acid esters of cellulose, especially mixed cellulose esters containing the radicles of both higher and lower fatty acids.

A method of making mixed cellulose esters of higher and lower fatty acids is by reaction between a lower fatty acid ester of cellulose and the anhydride of a higher fatty acid in the presence of a suitable catalyst. For example, cellulose aceto-stearate may be made by acting on cellulose acetate with stearic anhydride. The reaction is preferably effected in the presence of a diluent capable of dissolving the mixed ester as it is formed. On conclusion of the reaction the mixed ester may be precipitated from solution in the diluent by means of a liquid which is miscible with the diluent and in which the mixed ester is substantially insoluble. The preparation of mixed esters by reactions of this type is described in U. S. application S. No. 389,197 filed April 18, 1941.

It has been found that mixed esters of cellulose produced by methods such as that described above are frequently contaminated with very considerable amounts of the corresponding free higher fatty acid. For example, cellulose aceto-stearate may be obtained in admixture with 20 or 30% of its weight, or even more, of free stearic acid.

When attempts are made to separate the cellulose ester and the free higher fatty acid by solvent-extraction of the acid from the ester, a further difficulty has been met with. It is found that the higher fatty acid so obtained is itself contaminated with small quantities of cellulosic material, and that if this acid is converted into its anhydride and used again in the process, the cellulose ester produced suffers from a lack of clarity.

According to the present invention higher fatty acid esters of cellulose, and especially mixed cellulose esters of higher and lower fatty acids, which are contaminated with free higher fatty acid are purified by extracting the acid from the ester by means of an aqueous solution of a lower aliphatic alcohol which at ordinary temperatures is completely miscible with water, the concentration of the aqueous alcohol being such that, at the temperature employed for the extraction, the cellulose ester is not substantially softened thereby. By this means it is possible to effect a substantially complete separation of the cellulose ester and the higher fatty acid, so that a cellulose ester free from uncombined acid, and a higher fatty acid free from cellulosic impurities, are obtained.

It is preferred to use as the extracting agent an aqueous solution of ethyl alcohol, although other water-miscible lower aliphatic alcohols may be used, for example isopropyl alcohol. As already stated, an upper limit is set to the concentration in that the cellulose ester itself must not be softened materially by the alcohol; this precaution is important if the higher fatty acid is to be recovered free from cellulosic impurities. On the other hand, at too low concentrations and/or temperatures the solubility of the free acid in the solvent composition may be so low as to necessitate the use of inconveniently large quantities of the aqueous alcohol to effect the purification of the cellulose ester.

The production of cellulose aceto-stearate may be cited to illustrate the production of higher organic acid esters of cellulose and their purification by the process of the invention. This compound may be made by reaction between cellulose acetate and stearic anhydride, for example in the presence of zinc chloride and hydrochloric acid as catalyst, and of a lower alkylene dichloride, together with a small proportion of acetone, as diluent. The cellulose aceto-stearate goes into solution in the diluent in the course of the reaction, and when esterification is complete the cellulose aceto-stearate may be precipitated, for example by mixing alcohol with the diluent, or by evaporating off most of the diluent by adding thereto a substantial quantity of hot water. The precipitated ester may then be removed from the liquid, e. g. by filtration or decantation, and dried.

The cellulose aceto-stearate so obtained is usually contaminated with a considerable amount of free stearic acid, and may be purified according to the present invention by means of a thorough washing with aqueous ethyl alcohol of concentration between about 50 and 85% at a temperature up to about 80° C. The exact concentration of the aqueous alcohol which it is preferred to use varies with the temperature. For example, when working at temperatures of 50–80° C., aqueous ethyl alcohol of concentration between about 55 and 80% by weight may be used with advantage; if lower concentrations are used a larger volume both of the aqueous alcohol and of the alcohol itself is needed; on the other hand, higher concentrations tend to soften the cellulose aceto-stearate. At about 30–50° C. concentrations between about 65 and 85%, and at 20–30° C. concentrations between about 70 and 85%, may be employed. Particularly good results may be obtained by washing the cellulose aceto-stearate with aqueous ethyl alcohol of concentration between about 65 and 75% at temperatures between about 35° and 50° C. Similar conditions may be used in the treatment of other cellulose esters of higher fatty acids.

The purification of the higher organic acid esters of cellulose in accordance with the invention may be carried out as a batch process or as a continuous process. For example, a batch of the ester may be immersed in 6, 8, 12 or more times its weight of the aqueous alcohol, which is preferably stirred, for 15 or 30 minutes or more; if desired this treatment may be repeated one or more times. The lower the temperature and the concentration of the alcohol, the greater will be the total amount of alcohol required for complete extraction of the acid, whether the ester be washed in a single operation or in two or more stages. The alcohol may if desired already contain a proportion of the acid before the commencement of the treatment or of any stage of the treatment.

In another method, alcohol of the desired concentration and at the desired temperature may be passed continuously, preferably in a downward direction, through a column containing the ester to be washed, and the flow of alcohol continued until the alcohol leaving the column is substantially free from acid. Although a flow process of this kind may be carried out in a single column, it is preferred to employ a series of columns arranged so that the alcoholic liquor flows consecutively through each member of the series. Thus the flow may be arranged so that the initial acid-free alcohol comes first into contact with ester from which most of the acid has already been removed, and thence flows through columns containing ester of increasing acid content until in the final column the alcohol meets substantially untreated ester. When the alcohol leaving the first column is substantially free from acid, this column is cut out of the series and the purified ester removed. The column is then refilled with fresh unpurified ester and takes its place as the last column of the series. For example, stearic acid may be removed from cellulose aceto-stearate by a continuous treatment of this kind in 3, 4, 5 or more columns, the concentration, temperature, and rate and length of flow of the alcohol being preferably adjusted so that the final concentration of acid in the alcohol does not exceed about 5%.

At the conclusion of the treatment, alcohol remaining in the cellulose ester may be removed, for example by evaporation in a current of heated air from which the alcohol may subsequently be recovered by condensation. A preferred method however is to wash the alcohol out of the ester with water, either by a batch process or by a continuous process. Such washing is preferably carried out by upward displacement; by causing the water to flow through a series of columns containing ester of increasing alcohol content, it is possible to obtain aqueous washings containing up to 30% of alcohol. These washings may, for example, be further concentrated, e. g. by distillation, and used again in the process.

The acid which has been removed from the ester may be recovered from the alcohol in any convenient way. For example, it may be precipitated by cooling the alcoholic solution, by distilling off part of the alcohol, by diluting the alcoholic solution with water or by any two or all of these expedients. A certain amount of acid may if desired be left in solution in aqueous alcohol which is to be used again in the process.

Although the process has been described with reference mainly to cellulose aceto-stearate, it may be applied generally to higher fatty acid esters of cellulose, e. g. to simple esters such as cellulose, laurate, stearate, and palmitate and especially to mixed esters, containing for example any of the above acid radicles together with formyl, acetyl, propionyl or butyryl radicles. It may also be applied to other derivatives of cellulose containing a higher fatty acid radicle, for example cellulose ether-esters. Contamination of such esters with higher fatty acids is usually encountered when the esters are prepared by a method involving the use of a higher fatty acid anhydride, and the process of the invention is therefore of special value in treating products made by methods of this kind.

Having described my invention, what I desire to secure by Letters Patent is:

1. Process for purifying cellulose esters of higher fatty acids which are contaminated with free higher fatty acid and cellulosic impurities, which comprises removing the free fatty acid without at the same time removing substantial amounts of cellulosic impurities from the cellulose ester by treatment with aqueous ethyl alcohol of concentration 65–75% by weight at a temperature of 35°–50° C.

2. Process for purifying mixed cellulose esters of higher and lower fatty acids which are contaminated with free higher fatty acid and cellulosic impurities, which comprises removing the free fatty acid without at the same time removing substantial amounts of cellulosic impurities from the cellulose ester by treatment with aqueous ethyl alcohol of concentration 65–75% by weight at a temperature of 35°–50° C.

3. Process for purifying cellulose acetolaurate which is contaminated with free lauric acid and cellulosic impurities, which comprises removing the free lauric acid without at the same time removing substantial amounts of cellulosic impurities from the cellulose acetolaurate by treatment with aqueous ethyl alcohol of concentration of 65–75% by weight at a temperature of 35°–50° C.

4. Process for purifying cellulose acetopalmitate which is contaminated with free palmitic acid and cellulosic degradation products, which comprises removing the free palmitic acid without at the same time removing substantial amounts of cellulosic degradation products from the cellulose acetopalmitate by treatment with aqueous ethyl alcohol of concentration of 65–70% by weight at a temperature of 35°–50° C.

5. Process for purifying cellulose acetostearate which is contaminated with free stearic acid and cellulosic impurities, which comprises removing the free stearic acid without at the same time removing substantial amounts of cellulosic impurities from the cellulose acetostearate by treatment with aqueous ethyl alcohol of concentration of 65–75% by weight at a temperature of 35°–50° C.

6. Process for purifying cellulose esters of higher fatty acids which are contaminated with free higher fatty acid and cellulosic impurities, which comprises removing the free fatty acid without at the same time removing substantial amounts of cellulosic impurities from the cellulose ester by treatment with aqueous ethyl alcohol of concentration 65–75% by weight at a temperature of 35°–50° C. under conditions such that the concentration of the acid in the aqueous ethyl alcohol throughout the process is less than 5%.

7. Process for purifying cellulose acetolaurate which is contaminated with free lauric acid and cellulosic impurities, which comprises removing the free lauric acid without at the same time removing substantial amounts of cellulosic impurities from the cellulose acetolaurate by treatment with aqueous ethyl alcohol of concentration 65–75% by weight at a temperature of 35°–50° C. under conditions such that the concentration of the acid in the aqueous ethyl alcohol throughout the process is less than 5%.

8. Process for purifying cellulose acetopalmitate which is contaminated with free palmitic acid and cellulosic impurities, which comprises removing the free palmitic acid without at the same time removing substantial amounts of cellulosic impurities from the cellulose acetopalmitate by treatment with aqueous ethyl alcohol of concentration 65–75% by weight at a temperature of 35°–50° C. under conditions such that the concentration of the acid in the aqueous ethyl alcohol throughout the process is less than 5%.

9. Process for purifying cellulose acetostearate, which is contaminated with free stearic acid and cellulosic impurities, which comprises removing the free stearic acid without at the same time removing substantial amounts of cellulosic impurities from the cellulose acetostearate by treatment with aqueous ethyl alcohol of concentration 65–75% by weight at a temperature of 35°–50° C. under conditions such that the concentration of the acid in the aqueous ethyl alcohol throughout the process is less than 5%.

10. Process for the manufacture of cellulose esters of higher fatty acids, which comprises esterifying cellulose by means of the anhydride of a higher fatty acid, removing free higher fatty acid from the cellulose ester so produced by treatment with aqueous ethyl alcohol of concentration 65–75% by weight at a temperature of 35°–50° C., recovering the higher fatty acid from its solution in the aqueous alcohol, reconverting it into its anhydride and using it in the formation of further quantities of the cellulose ester.

11. Process for the manufacture of mixed cellulose esters of higher and lower fatty acids, which comprises esterifying a cellulose ester of a lower fatty acid by means of the anhydride of a higher fatty acid, removing free fatty acid without at the same time removing substantial amounts of cellulosic impurities from the cellulose ester so produced by treatment with aqueous ethyl alcohol of concentration 65–75% by weight at a temperature of 35°–50° C., recovering the higher fatty acid from its solution in the aqueous alcohol, reconverting it into its anhydride and using it in the formation of further quantities of the cellulose ester.

JAMES WOTHERSPOON FISHER.

Certificate of Correction

Patent No. 2,400,494.　　　　　　　　　　　　　　　　　　　May 21, 1946.

JAMES WOTHERSPOON FISHER

It is hereby certified that errors appear in the printed specification of the above numbered patent requiring correction as follows: Page 2, second column, lines 53 and 56, for the words "degradation products" read *impurities*; line 58, for "65–70%" read *65–75%*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.* of 35°–50° C. under conditions such that the concentration of the acid in the aqueous ethyl alcohol throughout the process is less than 5%.

7. Process for purifying cellulose acetolaurate which is contaminated with free lauric acid and cellulosic impurities, which comprises removing the free lauric acid without at the same time removing substantial amounts of cellulosic impurities from the cellulose acetolaurate by treatment with aqueous ethyl alcohol of concentration 65–75% by weight at a temperature of 35°–50° C. under conditions such that the concentration of the acid in the aqueous ethyl alcohol throughout the process is less than 5%.

8. Process for purifying cellulose acetopalmitate which is contaminated with free palmitic acid and cellulosic impurities, which comprises removing the free palmitic acid without at the same time removing substantial amounts of cellulosic impurities from the cellulose acetopalmitate by treatment with aqueous ethyl alcohol of concentration 65–75% by weight at a temperature of 35°–50° C. under conditions such that the concentration of the acid in the aqueous ethyl alcohol throughout the process is less than 5%.

9. Process for purifying cellulose acetostearate, which is contaminated with free stearic acid and cellulosic impurities, which comprises removing the free stearic acid without at the same time removing substantial amounts of cellulosic impurities from the cellulose acetostearate by treatment with aqueous ethyl alcohol of concentration 65–75% by weight at a temperature of 35°–50° C. under conditions such that the concentration of the acid in the aqueous ethyl alcohol throughout the process is less than 5%.

10. Process for the manufacture of cellulose esters of higher fatty acids, which comprises esterifying cellulose by means of the anhydride of a higher fatty acid, removing free higher fatty acid from the cellulose ester so produced by treatment with aqueous ethyl alcohol of concentration 65–75% by weight at a temperature of 35°–50° C., recovering the higher fatty acid from its solution in the aqueous alcohol, reconverting it into its anhydride and using it in the formation of further quantities of the cellulose ester.

11. Process for the manufacture of mixed cellulose esters of higher and lower fatty acids, which comprises esterifying a cellulose ester of a lower fatty acid by means of the anhydride of a higher fatty acid, removing free fatty acid without at the same time removing substantial amounts of cellulosic impurities from the cellulose ester so produced by treatment with aqueous ethyl alcohol of concentration 65–75% by weight at a temperature of 35°–50° C., recovering the higher fatty acid from its solution in the aqueous alcohol, reconverting it into its anhydride and using it in the formation of further quantities of the cellulose ester.

JAMES WOTHERSPOON FISHER.

Certificate of Correction

Patent No. 2,400,494.

May 21, 1946.

JAMES WOTHERSPOON FISHER

It is hereby certified that errors appear in the printed specification of the above numbered patent requiring correction as follows: Page 2, second column, lines 53 and 56, for the words "degradation products" read *impurities*; line 58, for "65–70%" read *65–75%*; and that the said Letters Patent should be read with these corrections therein that the same may conform to the record of the case in the Patent Office.

Signed and sealed this 6th day of August, A. D. 1946.

[SEAL]

LESLIE FRAZER,
*First Assistant Commissioner of Patents.*